United States Patent
Gasparro

(10) Patent No.: US 9,517,818 B2
(45) Date of Patent: Dec. 13, 2016

(54) SURFBOARD WITH A CAMERA MOUNT

(71) Applicant: Gianfranco Gasparro, Hermosa Beach, CA (US)

(72) Inventor: Gianfranco Gasparro, Hermosa Beach, CA (US)

(73) Assignee: Gianfranco Gasparro, Hermosa Beach, CA (US)

( * ) Notice: Subject to any disclaimer, the term of this patent is extended or adjusted under 35 U.S.C. 154(b) by 0 days.

(21) Appl. No.: 14/612,513

(22) Filed: Feb. 3, 2015

(65) Prior Publication Data

US 2015/0217839 A1    Aug. 6, 2015

Related U.S. Application Data

(60) Provisional application No. 61/935,112, filed on Feb. 3, 2014.

(51) Int. Cl.
| | |
|---|---|
| *B63B 35/81* | (2006.01) |
| *B63B 35/79* | (2006.01) |
| *B63B 35/85* | (2006.01) |
| *G03B 17/56* | (2006.01) |
| *G03B 29/00* | (2006.01) |

(52) U.S. Cl.
CPC .......... *B63B 35/7926* (2013.01); *B63B 35/85* (2013.01); *G03B 17/561* (2013.01); *G03B 29/00* (2013.01)

(58) Field of Classification Search
CPC ............................. B63B 35/7926; B63B 35/85
USPC ............................................ 441/79; 114/272
See application file for complete search history.

(56) References Cited

U.S. PATENT DOCUMENTS

| | | | |
|---|---|---|---|
| 7,985,111 B2 | 7/2011 | Gasparro | |
| 9,268,201 B1* | 2/2016 | Montgomery | ....... G03B 17/561 |
| 2007/0205241 A1* | 9/2007 | Mourao | ................. F16M 13/00 |
| | | | 224/401 |
| 2010/0061711 A1* | 3/2010 | Woodman | ............. B63B 25/002 |
| | | | 396/428 |

* cited by examiner

*Primary Examiner* — Stephen Avila
(74) *Attorney, Agent, or Firm* — Thomas Schneck

(57) ABSTRACT

A surfboard with a forward curved fin that extends forwardly of the nose of the surfboard. The curved fin supports a platform for an action camera usually pointed at a board user. At least one adjustable strut between the platform and curved fin can provide a desired elevation or angle to the platform and camera for action filming of a user of the surfboard.

19 Claims, 6 Drawing Sheets

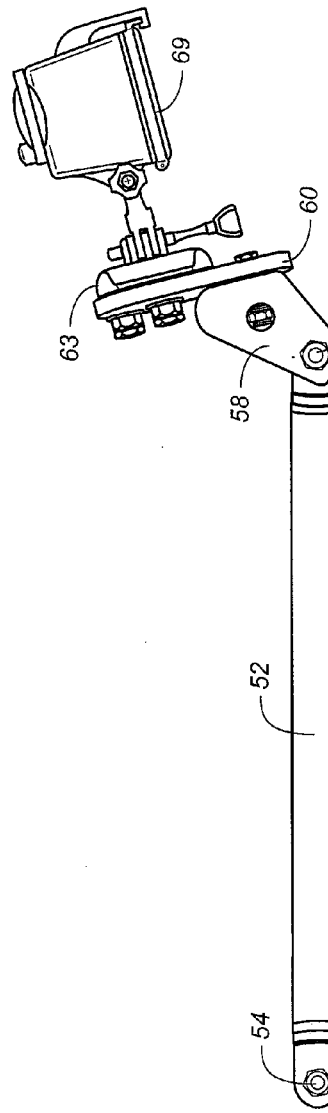
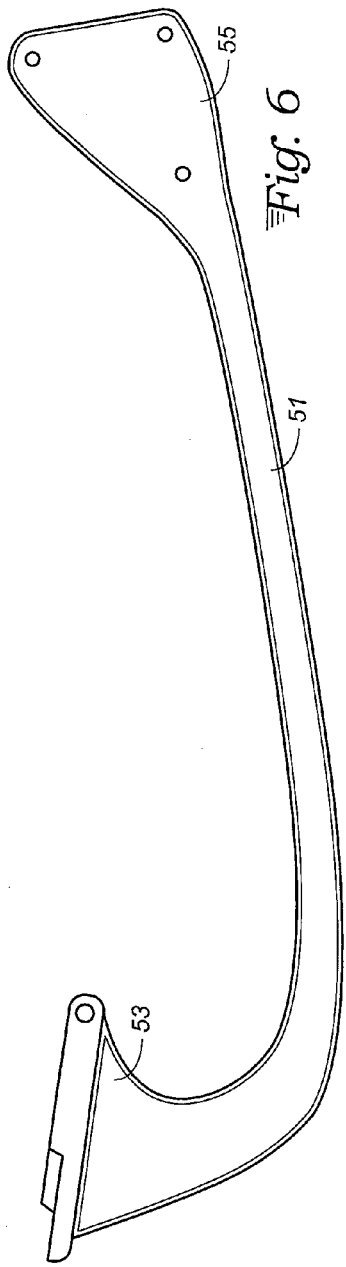
Fig. 5
Fig. 6

SURFBOARD WITH A CAMERA MOUNT

CROSS-REFERENCE TO RELATED APPLICATION

This application claims priority from provisional application Ser. No. 61/935,112 filed Feb. 3, 2014.

TECHNICAL FIELD

The invention relates to surfboards, and in particular to a forward fin for a surfboard or the like that can be used to support a camera.

BACKGROUND ART

Fins for surfboards are well known devices for steering and stability of a board. Fins are sometimes integrally formed with a board but often added as attachments using boxes, slots or plugs that are cut into the board. A typical fin for surfboards is shown in U.S. Pat. No. 7,985,111 to Gianfranco Gasparro.

SUMMARY OF INVENTION

The present invention employs a hook-like fin for a surfboard, paddle board or similar water craft, but projecting forwardly from a mounting location near the nose of the board to a location in front of the most forward portion of the board. The fin and ancillary members support an action camera. The mounting location for the fin may employ a box with a slot to receive a flattened end portion of a fin, or merely have slots or plugs of the type known in the art for mounting after market fins. For example, one type of plug type mount is similar to the FCS, for Fin Control System that consists of two tab slots, each in a plug, that can secure fin tabs with a screw to hold projecting tabs of a fin in place. The genuine FCS system is described at the website www.surffcs.com where a titanium rod in a polymer barrel in a holder inserted into the bottom side of a board is used to apply holding force to a fin. Alternative tab holders are simpler and known in the art. The hook-like fin projects forwardly from under the board to a location forward of the nose where an adjustable strut projects forwardly even further. The strut may extend upwardly at a selected angle but not necessarily. At the forward end of the strut, an upwardly extending camera base is mounted, with an action camera at the top of the base at a position to photograph a surfboard user's feet, legs, and body.

BRIEF DESCRIPTION OF DRAWINGS

FIG. 5 is a top plan view of a front fin and a strut mounted camera in accord with the invention.

FIG. 6 is a top view of an alternative front fin in comparison to the front fin of FIG. 5.

DESCRIPTION OF INVENTION

Figure 1:
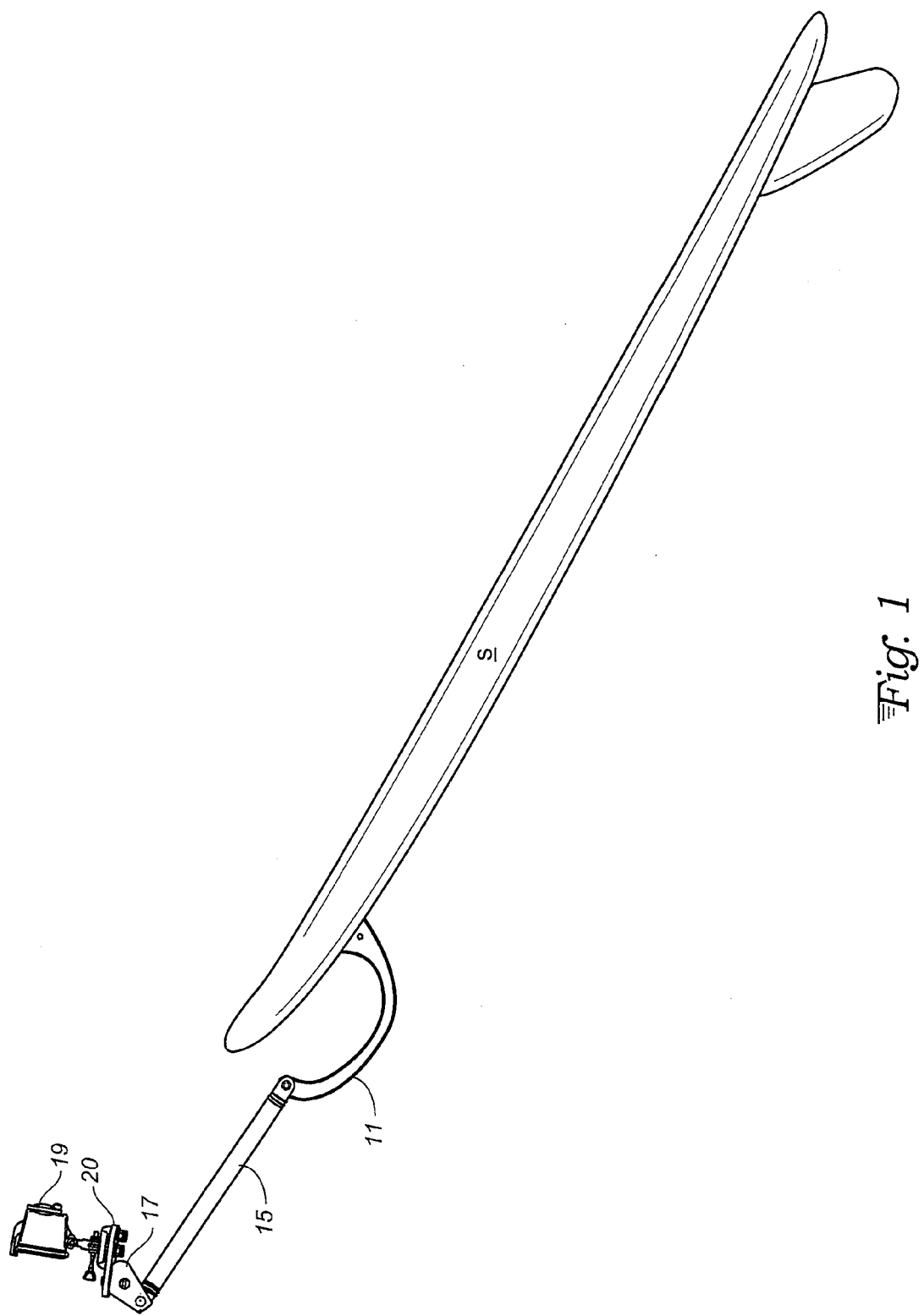
FIG. 1 is a side plan view of the apparatus of the invention.

With reference to FIG. 1, a surfboard, S, is shown with the hook-like fin 11 extending from about 9 inches rearwardly of the forward end of the board S in a forward direction in alignment with the longitudinal axis of symmetry of the board. Fin 11 is preferably made of a strong light weight composite material, such as carbon fiber and epoxy, although polymers will work. With this alignment there is no torque on the board, although much of the time the nose of the board may be out of the water as the weight of a surfer is usually at the rear of the board to closely control the rear fins. Fin 11 can have a series of spaced apart holes to reduce mass and to minimize steering effects and side-to-side resistance, if desired. However, some surfers prefer some steering control from the front of a board in which case there would be no holes. A first strut 15 extends in the forward direction from the most forward end of the hook-like fin 11 in a plane not substantially different from the general horizontal extent of board S, although the strut 15 may optionally be canted upwardly. The strut 15 is also light weight material, such as carbon-fiber epoxy. From the forward end of strut 15, a base plate platform 17 extents upwardly for supporting camera 19 at the top of a base plate 20.

Figure 2:
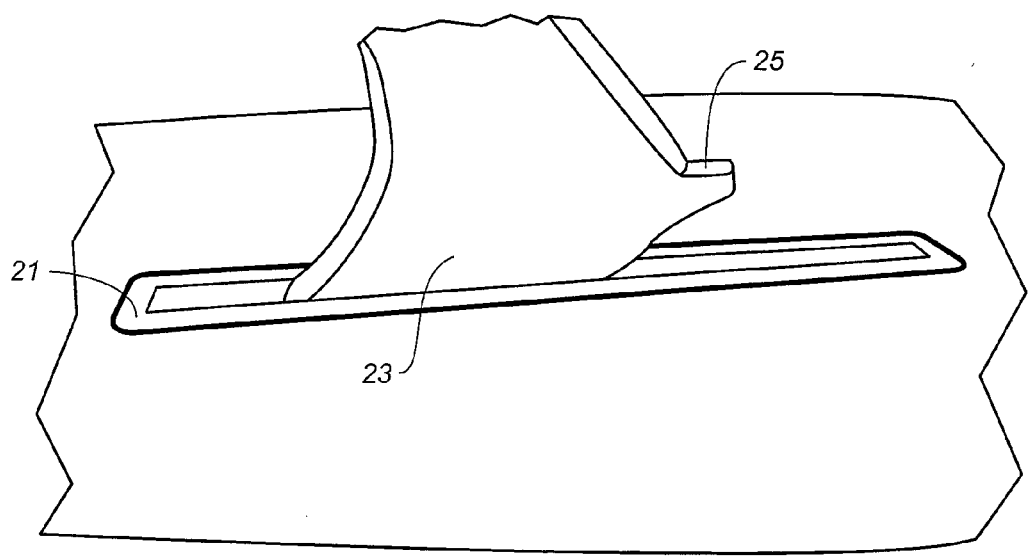
FIGS. 2 and 3 are front fin mounting plan views in accord with the invention.

FIG. 2 shows a box 21 in the bottom nose portion of a board for mounting the hook-like fin 23 that extends forwardly. The fin 23 is being inserted into the box to be held in place with a screw, including a screw to be placed in screw hole 25 when the fin is fully seated in the box. This fin mounting technique is well known in the art. There are other exemplary ways of mounting fins.

Figure 3:
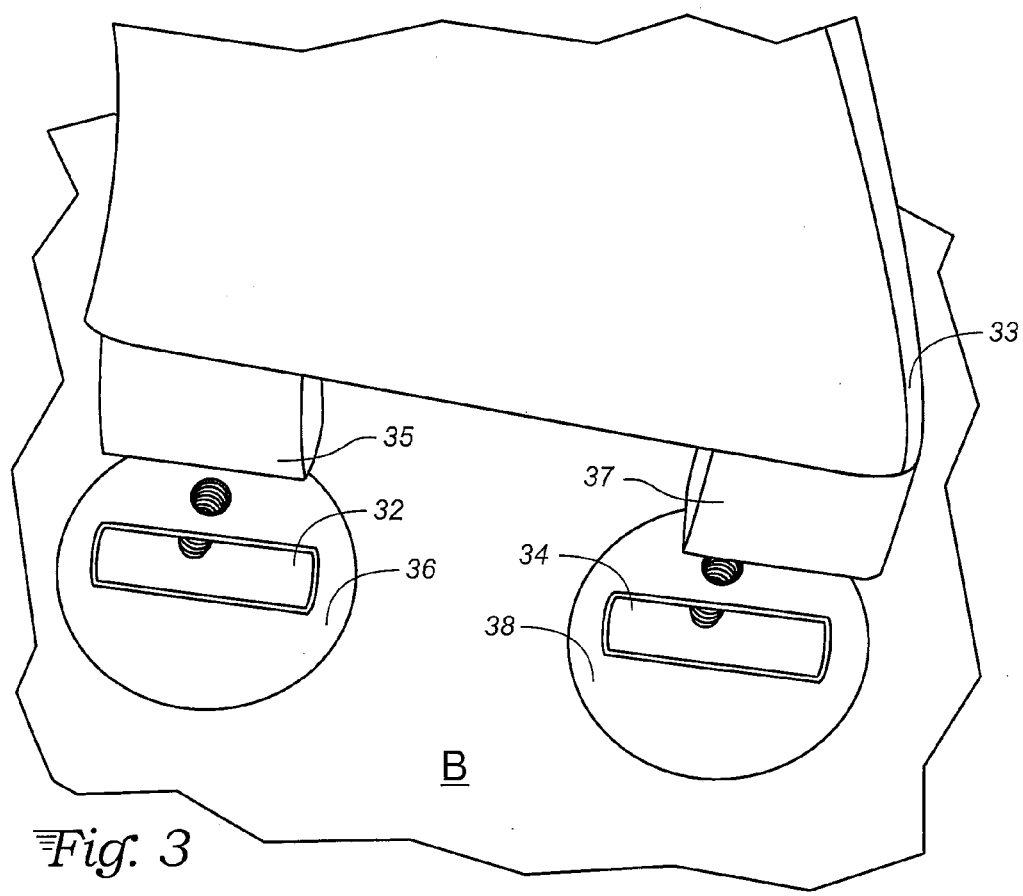
Figure 4:
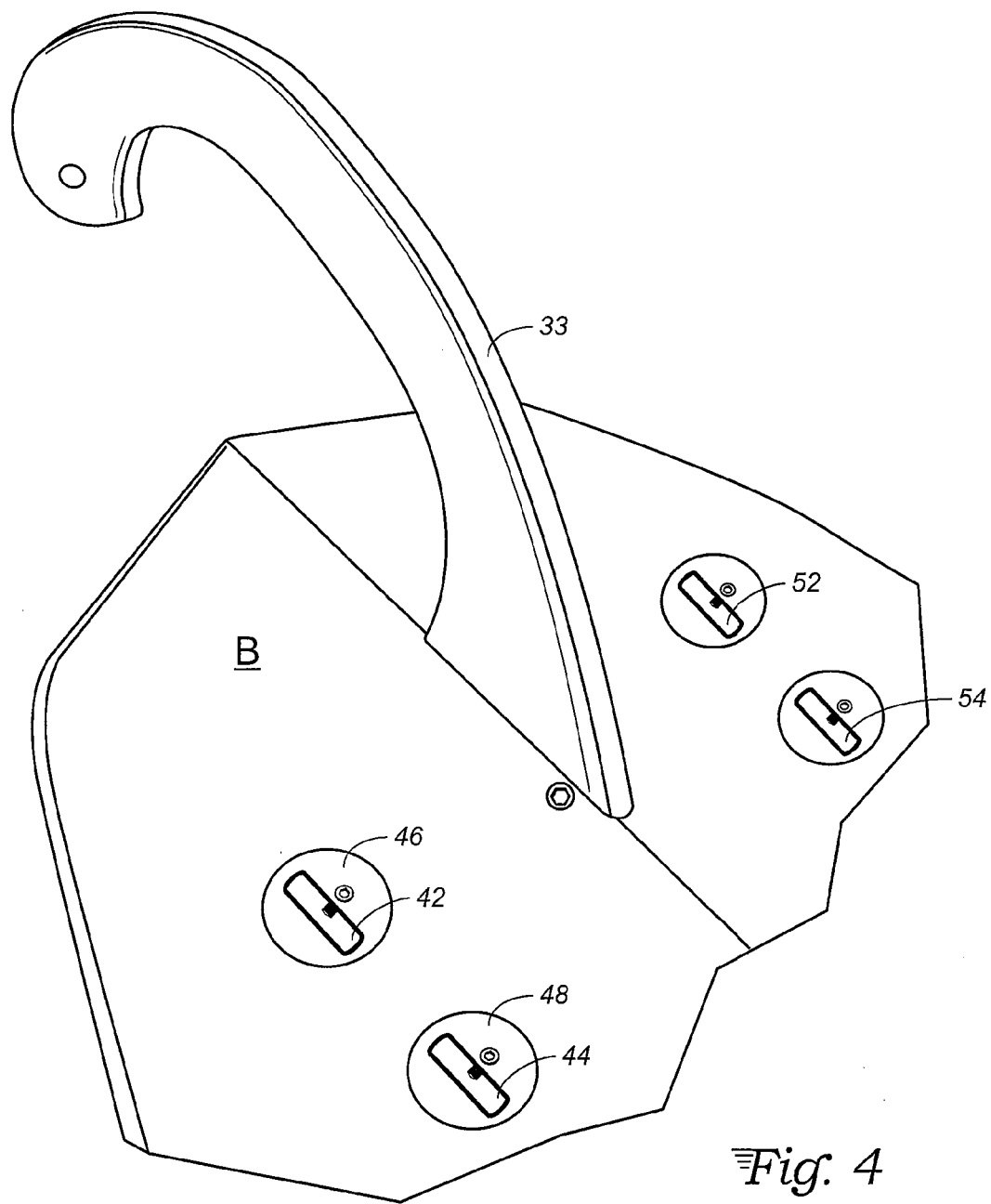
FIG. 4 is an alternate front fin mounting plan view with a front fin in place.

For example, in FIG. 3 a hook-like fin 33 is being inserted into the nose of a board, B, with the fin tabs 35 and 37 extending downwardly into tab-receiving slots 32 and 34, respectively, a few inches apart from each other. Fin 33 has a cross sectional convex shape typical for surfboard fins, with opposite ends being flattened for joinder to respective members. The slots 32 and 34 reside in the epoxy plugs 36 and 38 as part of a well known fin mounting technique. A fully mounted fin 33 in board B is shown in FIG. 4. The fin is mounted using the tab and slot technique described above. Exemplary tab slots 42 and 44 are shown in plugs 46 and 48 to illustrate spacing and to suggest that more than one forward hook-like fins are possible, with symmetry preserved with another pair of slots 52 and 54 on symmetrically opposite regions of the board. A pair of forwardly extending hook-like fins symmetrically offset from the board centerline allow twin stereoscopic cameras to be mounted for angular views instead of a head-on view.

In FIG. 5, various components of the invention may be seen. A shorter hook-like fin 61 is appropriate for shorter boards. The fin 61 has a continuously curved hook shape with twin tabs at a first end 64 and a screw hole 67 at opposite end 65 for joinder to a strut, such as strut 52. The forward fin end 65 uses hole 67 for fastening the strut 52 with fastener 54 at one end opposite a forward end 56 that supports base plate platform 58. The base plate 60 may have a curved upper end for mounting camera platform 63 that is attached to waterproof self-powered camera 69. The action camera may be controlled by wireless signaling, voice commands, inertial switches, or by wire or other known means. Camera controls are optional and are not required. FIG. 6 is an enlarged view of the longer hook-like fin 51, with opposed curved regions and a generally straight region between the curved regions. The longer hook-like fin 51 can be about two feet long. Flattened end 53 has an appropriate size for fitting into a box slot of a board near the nose end of the board, being fastened in the usual way.

Figure 7:
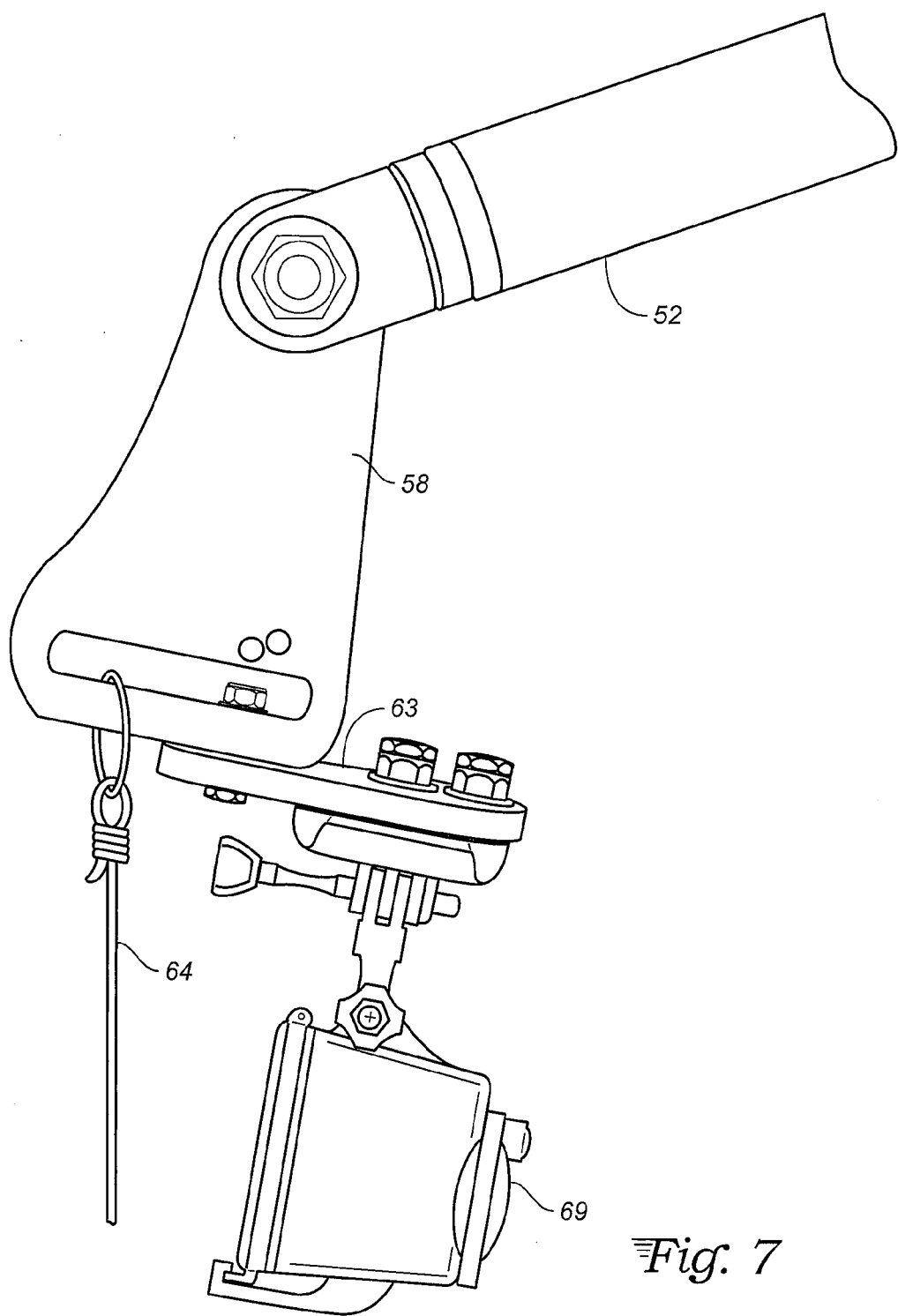
FIG. 7 is a top plan view of a camera mount detail.

In FIG. 7 strut 52 supports the base plate platform 58. In turn, the platform 58 is attached to base plate 63 and camera 69. The cord 64 may be used to control the camera, or may be used as a leash to salvage the camera if the strut or another member breaks and separates the base plate from the user. The strut 52 is joined to platform 58 and to the forward end of the hook-like fin using common fasteners. Note that the end of strut 52 is a flattened metal or plastic piece so that two flat surfaces are joined by common fasteners, such as a nut and bolt. Typically, all joining surfaces are flat, although this is not essential. On the other hand, the body of strut 52 is round, with the strut being a hollow tube for light weight strength, similar to bicycle fork carbon fiber tubing. The flattened metal ends of the strut are cemented in place.

Figure 8:
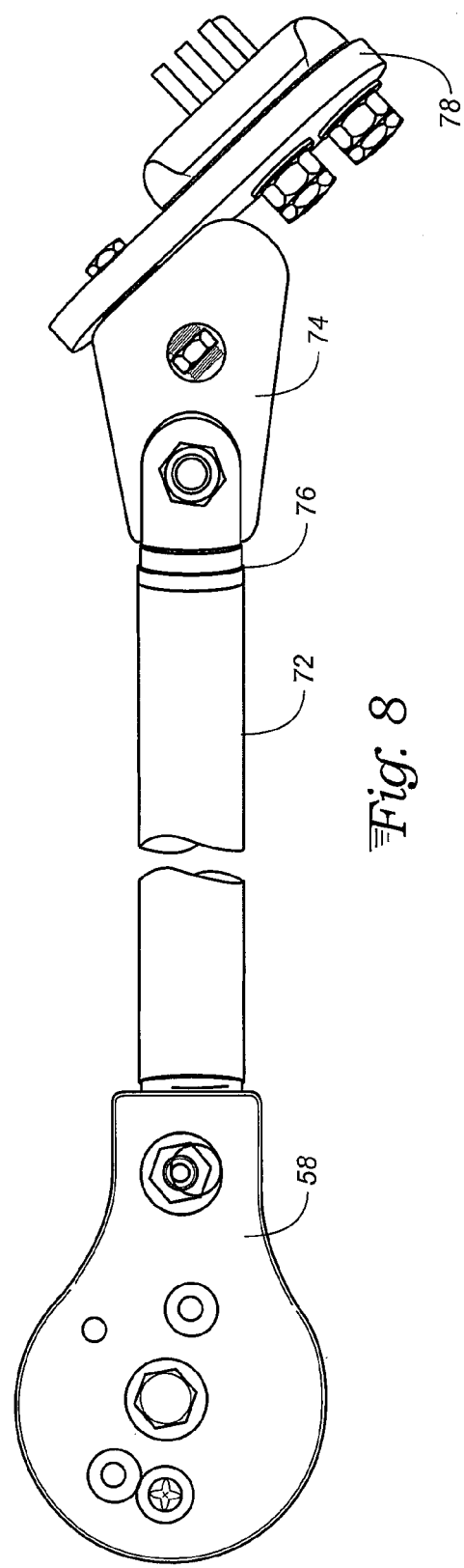
FIG. 8 is a top plan view of a strut-to-platform view with an ancillary strut as an alternative to the apparatus of FIG. 1.

In FIG. 8, a base plate platform 58 is connected to a base plate extender strut 72 for raising a second base plate platform 74. This places the camera base plate 78 further above the water line, or allows for angular adjustments such as tilted camera shots. The second strut 72 allows for angular adjustments not available from the first strut. A friction collar 76 allows turning base plate platform 74 to a desired angular adjustment different from angles of adjustment of the first strut. An action camera, such as a GoPro camera, is mounted on base plate 78 for continuous video recording or transmission of surfer motion on a surfboard.

In operation, the fin mounted camera sits above the water line and above the upper surface of a surfboard and is commanded to photograph continuous movement of the feet and legs of a surfer while the board is in waves or merely in the water.

The term "surfboard" in this application is intended to encompass paddle boards and similar boards.

The invention claimed is:

1. Apparatus for mounting an action camera comprising:
   a surfboard with a nose and a forwardly curved fin with a portion extending forwardly of the surfboard nose; and
   an action camera associated with said forwardly extending curved fin.

2. The apparatus of claim 1 wherein an angularly adjustable strut extends between the curved fin and the action camera.

3. The apparatus of claim 2 wherein the adjustable strut has a first end connected to the curved fin and a second end connected to a base plate supporting the action camera.

4. The apparatus of claim 3 wherein a base plate platform is connected between second strut end and the base plate.

5. The apparatus of claim 1 wherein the surfboard has a waterline and the forwardly extending portion of the curved fin extends at least to the waterline.

6. Apparatus for mounting an action camera comprising:
   a surfboard with a nose and a forwardly extending fin anchored to the board rearward of the nose and having a portion extending forwardly beyond the nose;
   an angularly adjustable first strut connected to the fin portion extending forwardly beyond the nose and having a distal end having a camera mount platform; and
   an action camera connected to the camera mount platform.

7. The apparatus of claim 6 wherein the forwardly extending fin is continuously curved.

8. The apparatus of claim 6 wherein the forwardly extending fin has opposed curved regions and a straight region therebetween.

9. The apparatus of claim 6 wherein a second strut is connected to the camera mount platform at a first end and a second camera mount platform is connected at a second end with the action camera connected to the second camera mount platform.

10. The apparatus of claim 9 wherein the second strut is angularly adjustable in at least one plane different from angles of adjustment of the first strut.

11. A method of action filming a user on a board for use in water, the board having a forward nose, comprising:
    providing a board for use in water having a member that extends forwardly beyond the nose of the board to a location out of the water with the user on the board, the member having a forward platform for supporting an action camera;
    attaching to said platform an action camera positioned to record said user on said board; and
    action filming said user;
    wherein said member comprises a fin supporting the platform onto which said action camera is mounted.

12. The method of claim 11, wherein said action camera positioned to record said user is above a waterline and above an upper surface of said board.

13. The method of claim 11, wherein said action filming records or transmits surfer motion on a board.

14. The method of claim 11, wherein said member extending beyond an end of the board comprises an angularly adjustable strut attached to said fin.

15. Apparatus for mounting an action camera comprising:
    a surfboard having a longitudinal axis and opposed ends with a hook-like fin extending from one of the ends of the surfboard, the fin supporting a camera base plate platform; and
    an action camera mounted on the camera base plate platform with the camera at a distance from the surfboard having a view for video recording or transmitting surfer motion on the surfboard.

16. The apparatus of claim 15 further comprising a first strut associated with the hook-like fin extending a distance of the camera base plate platform from the surfboard.

17. The apparatus of claim 16 further comprising a second strut connected to the first strut in a manner allowing for angular adjustment of the base plate platform.

18. The apparatus of claim 15 wherein the action camera is angularly adjustable.

19. The apparatus of claim 15 wherein the camera is receptive to filming commands capturing surfer motion on the surfboard.

* * * * *